United States Patent [19]

Stech

[11] Patent Number: 4,842,905

[45] Date of Patent: Jun. 27, 1989

[54] TESSELLATED PAPERMAKERS FABRIC AND ELEMENTS FOR PRODUCING THE SAME

[75] Inventor: William J. Stech, Summerville, S.C.

[73] Assignee: Asten Group, Inc., Charleston, S.C.

[21] Appl. No.: 151,892

[22] Filed: Feb. 3, 1988

[51] Int. Cl.⁴ .............................................. F16B 2/00
[52] U.S. Cl. ...................................... 428/33; 162/348;
162/358; 162/DIG. 1; 428/57; 428/58;
428/224; 428/280
[58] Field of Search ................. 162/DIG. 1, 348, 358;
428/33, 57, 58, 224, 280

[56] References Cited

U.S. PATENT DOCUMENTS 4,537,658 8/1985 Albert .................................. 162/348

Primary Examiner—James J. Bell
Attorney, Agent, or Firm—Volpe and Koenig

[57] ABSTRACT

A tessellated papermakers fabric and elements for making the fabric are disclosed. The elements are formed so as to have male or projection members which interlock with female or recess members. In alternative embodiments, interlocking elements which further utilize pintles for reinforcement of the connection are disclosed. The elements may be molded, extruded, dye stamped or laminated. The desired permeability is provided by forming apertures in the elements and can provide for air and moisture permeability characteristics which vary throughout the fabric. In addition, tessellated fabrics according to the instant invention may be subsequently processed to produce surface or embossing characteristics.

17 Claims, 3 Drawing Sheets

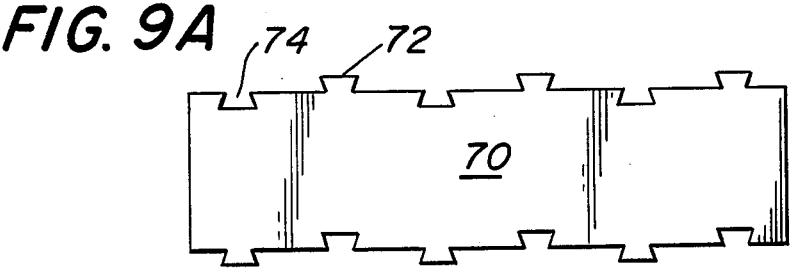
FIG. 9A
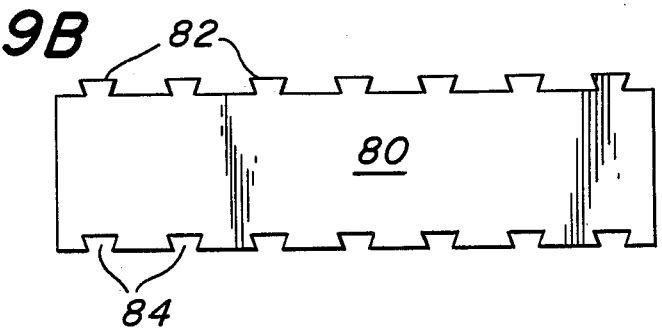
FIG. 9B
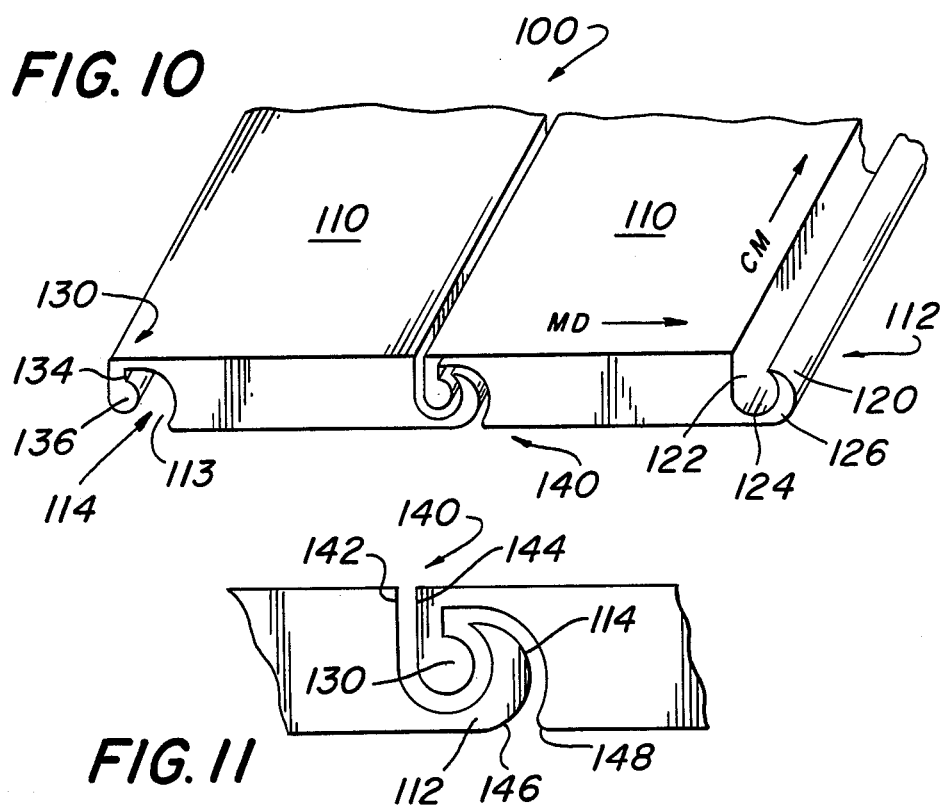
FIG. 10
FIG. 11

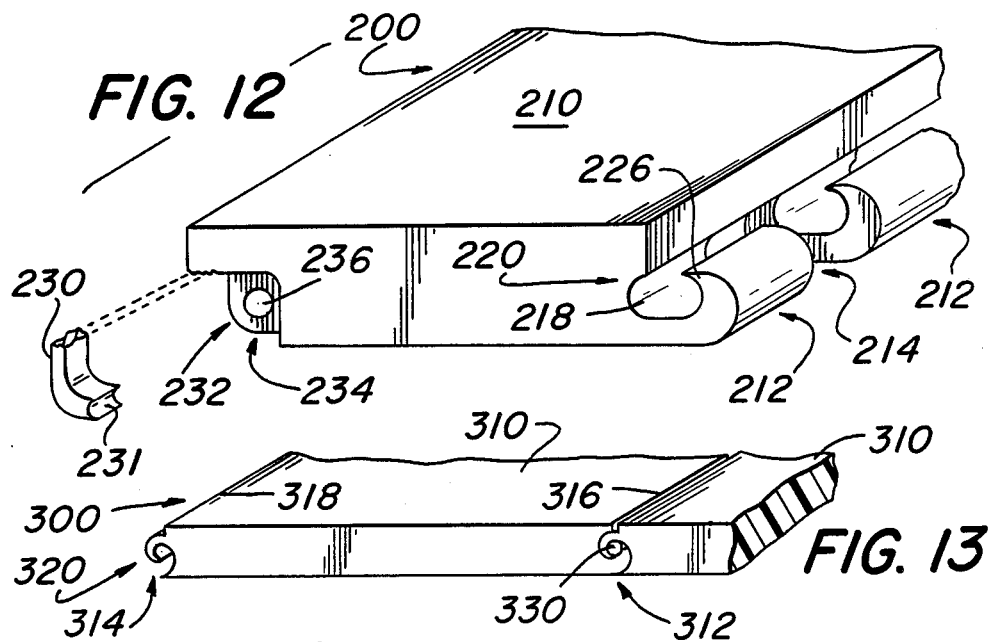
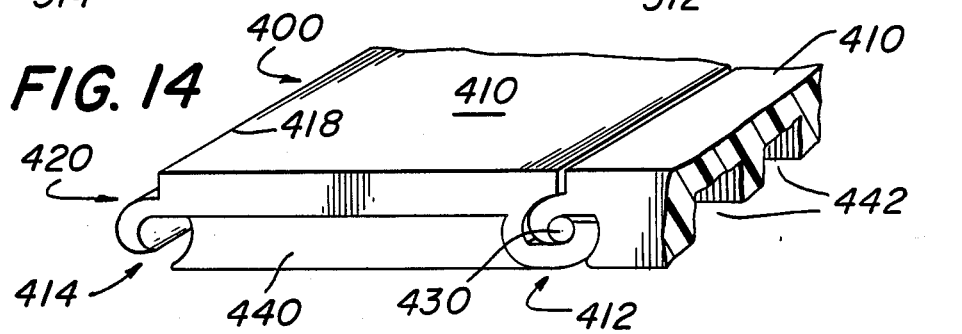
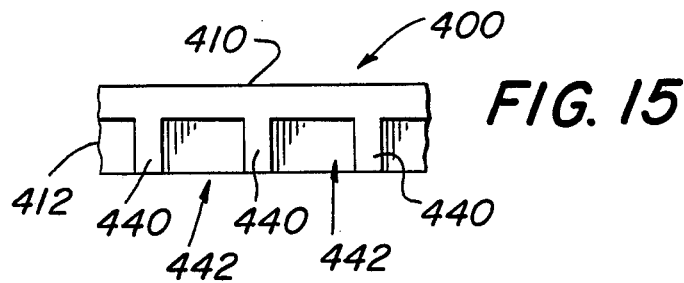
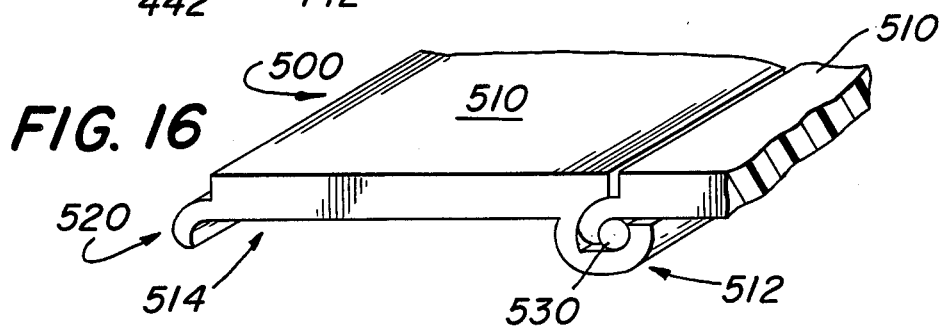

TESSELLATED PAPERMAKERS FABRIC AND ELEMENTS FOR PRODUCING THE SAME

BACKGROUND OF THE INVENTION

1. Field of the Invention

The present invention relates to papermaker's fabrics for supporting and conveying a paper web through the papermaking process. More particularly, the present invention relates to a papermaker's fabric formed from a plurality of tessellated elements.

2. Description of the Prior Art

In the papermaking process, a papermaker's fabric is used in the form of an endless belt-like structure which is supported by and advanced through the equipment by various machine rolls. This process and the various sections of the papermaking equipment, formation, press and dryer, will be known to those skilled in the art.

Recent developments in the field of papermaker's fabrics have lead to widespread use of synthetic materials in the fabrics. Previously, most fabrics were made through the use of a weaving process, using either the endless or flat technique. More recently, spiral fabrics have come into use. Spiral fabrics are not woven in the traditional sense but are produced by forming a plurality of spiral coils on a mandrel and then interconnecting the spiral coils through the use of joining wires or pintles. In spiral fabrics, the spiral coils may be generally equated with machine direction yarns and the pintles may be generally equated with cross machine direction yarns.

Although all of the prior art fabrics have found applications and have generally performed satisfactorily, it has been determined that each technique has its drawbacks. With respect to endless fabrics, it is essential to know the final finished width and length of the fabric before the weaving process starts. Accordingly, each fabric is custom made to a particular application. With respect to flat woven fabrics, it is possible to produce continuous lengths of fabric which may be cut to size, however, it is generally required that the width of the fabric be determined at the time of weaving. With respect to spiral mesh fabrics, they provide tremendous flexibility as to assembly of fabrics in different lengths and widths but are less adaptable to desired changes in drainage, permeability and surface characteristics.

Prior art fabrics have almost always been limited to materials which are available in fiber form or to materials which could be formed into fibers. The fabric designer almost always had to make compromises when designing the fabric because of the limited materials available. For example, when designing for either stretch resistance or wear resistance, the designer frequently had to compromise the fineness of the fabric. Although these compromises were acceptable in many applications, the required compromises frequently resulted in either less than ideal fabrics or less than ideal product.

Although all of the prior art fabrics have performed satisfactorily in given applications, the art still desires a means for quickly and economically producing fabrics of various lengths, widths and surface characteristics. In all papermaking fabrics, the parameters of air permeability, drainage, moisture retention and fabric stability are of concern to the fabric producer and user.

In view of the above, it is the intent of the present invention to produce papermakers fabrics inexpensively and efficiently without any reduction in fabric reliability or adaptability. It is a further intent of the present invention to eliminate design compromises, improve uniformity of the fabric and to eliminate the reliance on a limited range of materials.

In order to achieve such a fabric, one assembles a plurality of elements to achieve the necessary length and width of the fabric. It is contemplated that elements will be provided in standard sizes. However, as will be recognized by those skilled in the art, the required length of fabric will vary according to papermaking equipment. Accordingly, it is contemplated that the elements will be provided in standard sizes which will constitute the majority of the fabric and will be provided in certain other standard complementary sizes in order to form the final closure and the end or selvage of the fabric width.

Consider, for example, the need to finally close a fabric into an endless structure. In order to provide the final closure, the elements may be provided with a width which is the same as the remaining element but with a shorter dimension between the leading and trailing edges. These complementary elements may be provided in a variety of lengths less than the standard elements. Likewise, the end or selvage elements may be provided with the standard length between leading and trailing edges but with a somewhat reduced width. Once again, these elements may be provided in various widths. After final assembly of the tessellation, the width and/or selvage ends may be further trimmed by known techniques which are common with respect to cutting synthetic materials. In this matter, a reasonably precise fabric with uniform selvages may be inexpensively and efficiently assembled.

SUMMARY OF THE INVENTION

It is the purpose of the present invention to provide a papermaker's fabric which is comprised of a plurality of tessellated elements which have been interconnected to produce a tessellation of a desired length and width. Likewise, the fabrics of the present invention are designed to produce the desired air and/or moisture permeability and/or drainage characteristics while providing increased control over the characteristics of the paper carrying surface of the fabric.

BRIEF DESCRIPTION OF THE DRAWINGS

FIG. 9A is an alternative element for use in producing tessellated fabrics.

FIG. 9B is an alternative construction of the element shown in 9A for producing tessellated fabrics.

FIG. 10 is an alternative element for use in producing tessellated fabrics.

FIG. 11 is a fragmentary instant section of the joint depicted in FIG. 10.

FIG. 12 illustrates an alternative embodiment of the element depicted in FIG. 10.

FIG. 13 illustrates another alternative element which utilizes a pintle in construction of the fabric.

FIG. 14 is a second alternative embodiment of an element which utilizes a pintle in construction of the fabric.

FIG. 15 is an instant section taken from the right hand side of FIG. 14.

FIG. 16 is an alternative embodiment of the element depicted in FIG. 14.

DETAILED DESCRIPTION OF THE PREFERRED EMBODIMENTS

Figure 1:
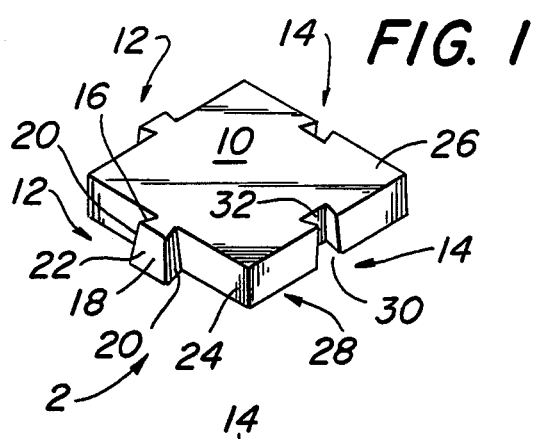
FIG. 1 is a perspective view of a preferred element according to the invention for producing tessellated fabrics.

Referring now to FIG. 1, there is shown a preferred element 2 in accordance with the instant invention. The element 2 may be of any moldable or extrudable synthetic material, however, the material will generally be selected to have favorable characteristics with respect to the harsh environment of the papermaking process. The fabrics according to the instant invention will be a tessellation of elements, similar to 2, which are arranged to a desired width and length. Each element has a body portion 10 which is generally equal sided. That is, the elements are capable of side to side match-ups in the manner of a mosaic. Along two sides of the body 10 there is an integral male member or projection 12 and on each of the remaining two sides a female member or recess 14 is provided which complements the male member or projection 12. In the preferred embodiment the projections 12 and recesses 14 are provided on adjacent sides, however, they could as easily be provided on opposite sides of the body 10. Since the body 10 is preferably square, the projections and recesses could be on opposite sides of the body 10 and the elements could be rotated for interconnection.

Still with reference to FIG.1, it can be seen that the paper contact surface or upper plane 16 of the male member projection 12 is trapezoidal in shape. The base or lower plane 18 of projection 12 is likewise trapezoidally shaped, however, it has a larger area than upper plane 16. Accordingly, side walls 20 of the projection 12 will project inwardly from the plane defined by facing wall 22 of the projection 12 and inwardly toward upper plane 16. In order to complement projection 12, the recess 14 has a similar trapezoidal configuration. The base of recess 14 encloses a trapezoidal area 30 which is greater than the trapezoidal area 32 which is enclosed by the upper plane or paper contact surface of the recess 14.

In the preferred embodiment, it is expected that the upper plane 26 of the element 2 would define the paper carrying surface and the lower plane 28 would define the machine contacting surface. Configured thusly, normal machine forces will tend to continually exert an outward pressure which will serve to lock the projection 12 within the recess 14 and preserve the integrity of the fabric. Likewise, the trapezoidal shape will tend to prevent dislocation of the fabric as a result of running forces developed in the plane of the fabric.

Figure 2:
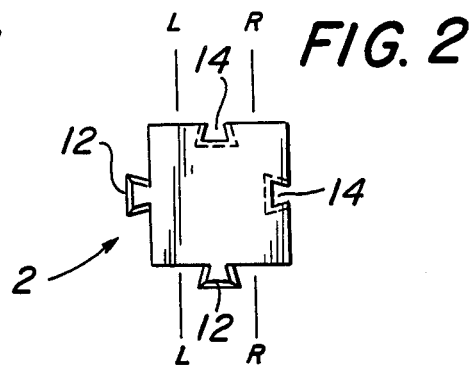
FIG. 2 is a plan view of the element depicted in FIG. 1.

With reference to FIG. 2, a plan view of element 2, the technique for terminating a fabric at the right and left portions thereof will be described. For purposes of explanation, assume that the fabric is assembled with the projection 12 extending along the left hand edge thereof. In this case, the fabric may be assembled in two ways. In the first method, the fabric is assembled to slightly greater than the desired width and then the element is trimmed along the line LL of FIG. 2. This will produce the left hand edge. Similarly, the fabric may be trimmed along the line RR of FIG. 2 to produce the right hand edge. Those skilled in the art will recognize that such trimming may be accomplished by known techniques, such as hot knife techniques or ultrasound techniques. Alternatively, the edge may be accomplished by providing respective elements 2 which have been truncated along the respective lines LL and RR prior to assembly.

Figure 3:
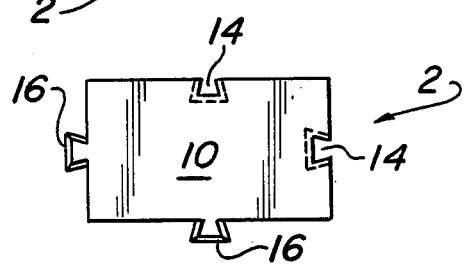
FIG. 3 is a plan view of a preferred alternative embodiment of the element of FIG. 1.

Generally, the entire fabric may be assembled in the lengthwise or machine direction dimension employing equal sided elements 2 as depicted in FIG. 1. This is possible due to the normal adjustments which exist on papermaking equipment. However, in those instances where such adjustment is not available, the fabric may be terminated using an element 2 as depicted in FIG. 3. The element 2 of FIG. 3 will have a body portion 10 like that of element 2 in FIG. 1; however, the body portion 10 will be foreshortened in the lengthwise direction but equal to element 2 of FIG. 1 in the widthwise or cross machine direction. In the event that the fabric is constructed of elements which have the projections and recesses on opposite sides of the element, it will be necessary to provide two styles of the foreshortened elements depicted in FIG. 3.

Figure 4:
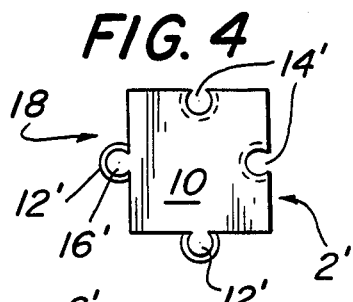
FIG. 4 is a plan view of a preferred alternative embodiment of the element of FIG. 1.
Figure 5:
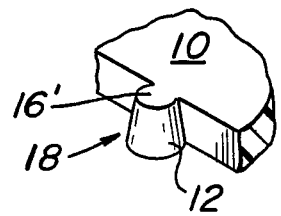
FIG. 5 is a fragmentary section showing a male or projection member of the element depicted in FIG. 4.

With reference to FIG. 4, there is shown an element 2' which generally corresponds to the element 2 of FIG. 1. Element 2' differs from element 2 in that the male and female member are of a different geometric configuration than that depicted in FIG. 1. In FIG. 4, the projections 12' are truncated conically shaped projections wherein the base 18' has a larger area than the upper plane 16'. This may be seen clearly with reference to FIG. 5. Recess 14' is complimentary to projection 12' as described previously for recess 14.

It will be recognized by those skilled in the art that the male members and female members 12 and 14 respectively may be of a variety of geometric configurations. Likewise, it will be recognized that the complementary geometric configurations do not necessarily have to interlock in the direction of the paper carrying surface. However, it is preferred to maintain simple geometric configurations and to incorporate the locking feature. This preference is based upon both the ease of molding less complex configurations which incorporate the interlocking feature and the desirability of assuring fabric integrity.

Figure 6:
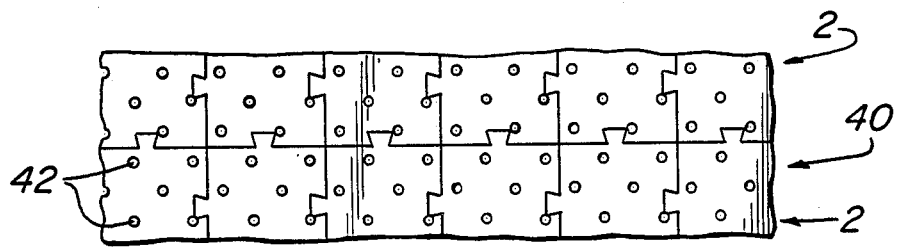
FIG. 6 is a section of a tessellated fabric utilizing the element depicted in FIG. 1 and illustrating apertures therein.

With reference to FIG. 6, there is depicted a section of fabric 40 which is a tessellation of elements 2. It can be seen that a tessellation is an assembly of elements which have interlocking geometric shapes which maintain the elements relative to each other, much in the manner of a puzzle. In FIG. 6, the elements 2 are shown as having a plurality of apertures 42. As will be understood by those skilled in the art, the apertures 42 will define the air permeability and/or drainage characteristics of the fabric 40. Apertures 42 may be provided in the element 2 at the time it is produced, such as by molding. However, it is presently preferred to produce the elements 2 in the manner depicted in FIG. 1 and to provide the apertures 42 in a later processing step. For example, the tessellation is assembled to its desired size and then subjected to a heat setting and aperturing process which fixes the respective elements 2 one to the other and produces the apertures 42. In addition to producing apertures in the fabric, it is also possible to produce surface characteristics on the fabric 40 such as through the use of a heated calender roll or embossing roll.

Figure 7:
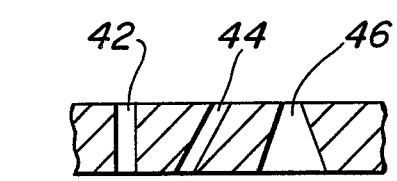
FIG. 7 is an illustration of several various apertures suitable for utilization in the fabric of FIG. 6.

With reference to FIG. 7, there are depicted several of the variations of the apertures which may be produced in fabric 40. Aperture 42 of FIG. 7 corresponds to aperture 42 of FIG. 6 and is a straight through bore. Aperture 44 is an angular bore which may be desirable for directing water flow or for producing gradients in the drainage and moisture characteristics of the fabric. Likewise, aperture 46 may be utilized to produce more rapid drainage characteristics or to enhance gradients within the fabric structure. It will be obvious that other aperture geometry may be utilized according to design applications.

From the foregone, it can be seen that the present invention provides the fabric designer with flexibility which has been unknown heretofore in the art. Since the elements may be molded or constructed from other than filament materials, the designer is no longer limited to those materials which may be produced in yarn like structures. Accordingly, the fabric designer may select any material which can be worked into the required shape. While it is contemplated that the elements will be molded, it is also recognized that the elements may be laminated, extruded or stamped from sheet material through the use of suitable dies. Thus, the fabric designer may take advantage of the characteristics of several materials within a single fabric. In addition to the materials advantages, the designer is also provided with a means for modifying fabric characteristics to meet the different environments which exist across the width of the paper machine. This permits the fabric designer to more fully accommodate the characteristics and environment of the papermaking equipment.

With respect to the structural integrity of the tessellation, it is believed that the assembly will provide sufficient strength to permit handling and installation of the fabric. However, it is suggested that a mild, water soluble adhesive be used during final assembly. The water soluble adhesive will assist in bonding of the fabric but will be readily removed upon installation and operation.

Figure 8:
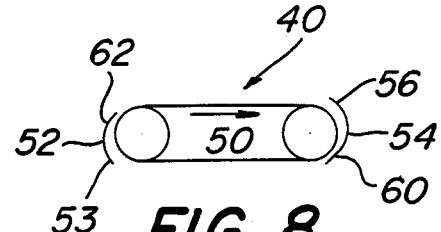
FIG. 8 is an illustrative figure which illustrates a guide means usable with a fabric according to the present invention.

With respect to guiding of the fabric on the papermaking equipment as it circumvents the end rollers, it is believed that the locking nature of the projections and recesses is sufficient to assure fabric integrity. However, provisions may be made to control any potential dislocation of the elements. With reference to FIG. 8 there is shown one method of guidance. The fabric 40 is mounted between carrier rolls 50 as is known to those skilled in the art. The fabric 40 will operate in the same manner as prior art fabrics. However, in realization that the elements may have a potential to separate as they negotiate the circumference of the rolls 50, the papermaking equipment is provided with wrap-around shields 52 and 54. The location and arc size of the shields 52 and 54 will be determined by the particular equipment on which the fabric is to be utilized. As a general matter, each shield will be mounted so as to locate the entry at the point where the fabric begins to conform to the circumference of the roll 50. The ends 56 and 58 are positioned from the roll by a distance greater than the caliper of the fabric but less than the element size. Thus, it can be seen that the elements will not become dislodged since they will be retained by the shield. The distance of the shields from the rollers 50 is continually decreased until it reaches the respective ends 60 and 62. At the respective ends 60 and 62, the shield is positioned from the roller by a minimum distance which is at least equal to the caliper of the fabric.

As can be seen from the above, the fabric 40 will enter the respective shield and be continually monitored so as to assure that the fabric exits the other end as a fabric. Although the shields may be in constant contact with the fabric, it is believed that this is not necessary and will lead to undue wear of the fabric. Since most fabrics are heat set prior to use it is believed that the elements will maintain the complementary fit and it is therefore desirable to reduce the amount of contact, other than that necessary for fabric performance, which takes place between th fabric and shields.

With reference to FIG. 9A, there is shown an alternative embodiment of the invention. In this embodiment, each of the tessellation elements 70 will be made to have a longitudinal length which corresponds to the cross machine direction width of the fabric. The latitudinal length of the element will preferably extend in the machine direction and may be of any length which is consistent with machine design. Each of the elements 70 has alternating tapered projections 72 and recesses 74 formed along the longitudinal edges thereof. Each of the longitudinal edges is preferably configured so as to complement the opposite longitudinal edge on a second element 70. Thus, a plurality of the elements 70 will be provided and the adjacent longitudinal edges interconnected to form the fabric. Although there is no minimum distance between tapered projections 72 and recesses 74, it will be understood that a sufficient distance should be maintained to permit flexing of the element 70 when the elements are tessellated.

With reference to FIG. 9B, there is shown an alternative element 80 which is generally similar to element 70. However, in the embodiment of FIG. 9B, the element 80 has all of the male members or projections 82 aligned along one longitudinal edge thereof and all of the female members or recesses 84 aligned the opposite longitudinal edge thereof. In the embodiment of FIG. 9B, the projections 82 and recesses 84 may be placed very close to each other. Since there is no need to rotate the element 80 in order to tessellate the longitudinal edges, when preserving the tapered geometric configuration, the strip will accommodate minimum distances between adjacent members.

With reference to FIG. 10, there is shown an alternative embodiment of the present invention. In this embodiment, each of the elements 100 is modified to incorporate a snap-fit geometry. Additionally, the elements of the tessellation will be made to have a longitudinal length which generally corresponds to the cross machine direction of the fabric. The latitudinal length of the element will preferably extend in the machine direction and may be of any length which is consistent with machine design. Each of the elements 100 will have a projection 112 formed along one longitudinal edge thereof and a recess 114 formed along the opposite longitudinal edge thereof. The projection 112 will have an arcuate leading edge 120 and will be spaced from the body 110 by a slot 122. The interior portion 124 of the projection 112 is likewise arcuate in shape and terminates behind the trailing edge 126 of projection 112. Thus, projection 112 is formed in the shape of a reversed "J". With reference to the recess 114, it can be seen that it is formed with a complementary structure. The downwardly depending portion 130 is spaced from the body 110 by a slot 113. Slot 113 is dimensioned to accept a projection 112 without causing disruption of the alignment between the various body portions of the respective elements. A second slot 134 is defined between the lower plane of the body portion 110 and the node 136. The slot 134 is dimensioned to accommodate the trailing edge 126 of projection 112. With reference to FIG. 10, it can be seen that the portion 130 is similarly formed as a reverse image "J" and will complement projection 112. It will also be recognized that the terms "projection" and "recess" are used solely for the purpose of description and that the opposite term may equally apply to either lateral edge of the element 100. Interconnection of the projection 112 and recess 114 may be made either by a snap fit, by rotating the edges one to the other or by placing the elements end to end and sliding them in opposite directions to cause interconnection.

With reference to FIG. 11, there is shown an exploded sectional detail of the joint 140 which has been exaggerated for purposes of illustration. It is to be understood that one surface of the element 110 should be designated as the paper carrying surface. To this end, the edges 142 and 144 of the respective elements have been shown as essentially square in order to produce an advantageous paper carrying surface and the edges 146 and 148 have been shown as rounded to assist in running of the fabric about the rollers. It will be understood that this relationship can be reversed such that the projection 112 would run in the upper surface and the recess 114 would run in the lower surface.

With reference to FIG. 12, there is shown another alternative embodiment of the present invention. The embodiment depicted in FIG. 12 utilizes an auxiliary pintle or joining wire to further retain the respective elements 200. The use of pintles is well known to those skilled in the art. The element 200 of FIG. 12 is similar to that of FIG. 10 and differs only as to the auxiliary means of interconnecting the elements.

FIG. 12 has been fragmented to show the pintle connection means in projection 232. The projection 230 is similar to projection 130 of FIG. 10 except that the leading edge 231 has been made concave to accept a pintle.

Element 200 has a plurality of projections 212 which are spaced along a longitudinal edge thereof and separated by recesses 214. Each of the projections 212 is separated from the body portion 210 so as to define a channel 218 for receiving a pintle and a projection 230. The trailing edge 226 of projection 212 is separated from body portion 210 by a slot 220. The slot 220 is dimensioned to accept projection 230 which cooperates with trailing edge 226 to confine the pintle inserted in the channel 218. On the opposite longitudinal edge of the element 200 there is a provided a series of recesses and projections which complement the recesses and projections 212 and 214 respectively. Recess 234 is dimensioned to receive the projection 212 and the projection 232 is dimensioned to be received within the recess 214. In this manner the longitudinal edges of the fabric are placed adjacent to each other and form a carrying surface. The projection 232 includes a pintle channel 236 which is dimensioned in accordance with the pintle dimensions of receiving channel 218. In this manner, elements may be assembled with their respective longitudinal edges in abutment and the pintle inserted through the pintle channel formed by 218 and 236. If desired, the projections 232 and 212 may be identical projections, however, it is believed that the closing of the projection 232 assists in producing a more favorable machine contact surface on the lower plane of the element.

With respect to FIG. 13, there is shown another alternative embodiment of the invention. Each of the elements 300 will have a body portion 310 which is similar to that described previously with respect to the embodiments of FIG. 10 and FIG. 12. However, in the embodiment of FIG. 13, each of the projections 312 is formed so as to be somewhat recessed behind the longitudinal edge 316. Thus, the projection 312 will resemble a "C" shape which has been rotated to rest on its back. On the opposite longitudinal edge of the element 300, the recess 314 is formed by disposing the hook shape element 320 slightly to the rear of the longitudinal edge 318. In assembling the fabric, the hook 320 is disposed within the body of the projection 312 and the leading edge of the projection is received within the recess 314. In this construction, a channel is defined for receiving an auxiliary pintle 330. As can be seen from FIG. 13, the final construction provides a fabric in which the lateral edges are adjacent to each other as described before in previous embodiments.

With reference to FIG. 14, there is shown another alternative embodiment. The embodiment of FIG. 14 is in most respects similar to that described with respect to FIG. 13. However, in the embodiment of FIG. 14, the gauge of the fabric has been increased by disposing the projections 412 and the recesses 414 in a lower plane. Although any of the prior constructions could be made in an equal gauge, the present construction is intended to provide additional machine runners 440 and to provide channelling for drainage and moisture removal. In all other respects, the configuration of FIG. 13 is similar to that of the previously described embodiments.

With reference to FIG. 15, the runners 440 will be further described. It can be seen that the runners 440 are spaced along the longitudinal edge of the element 400. The plurality of runners 440 produce a plurality of cavities 442 which are disposed beneath the body portion 410. In this manner, water or moisture drawn through the apertures in the element body may be quickly removed.

As can be seen with reference to FIG. 14, the configuration of the trailing edge of the runner 440 will not interfere with assembly or use of the fabric but will provide a constant running and transition surface.

With reference to FIG. 16, there is shown an element 500 which is in all respects, save for the runner 440, the same as that previously described for element 400 of FIG. 14. Although the element of FIG. 16 is presently not preferred for those applications in which the element will run with its longitudinal length in the cross machine direction, element 500 of FIG. 16 may find application where the lower plane of the element will not create fabric bounces as a result of contact with the rollers. In addition, element 500 may find application in those constructions where the element runs with its longitudinal length in the machine direction. In these applications, it is contemplated that the fabric ends would be joined by a mechanical mean or a subsequent heat treating and/or a remolding process.

One additional feature of the invention which will be recognized by those skilled in the art is the advantage of fabric repair by replacement of elements in a tessellation. Thus, a fabric need not be discarded if damaged. Good relatively unworn elements may also be reused in other fabrics or as repair elements.

What is claimed is:

1. A papermakers fabric comprised of:
a plurality of tessellated elements interconnected by complementary geometric shapes in a tessellation commensurate with the desired length and width of the fabric.

2. The fabric of claim 1 wherein the fabric is endless.

3. The fabric of claim 1 wherein the fabric is seamed.

4. The fabric of claim 1 wherein the fabric is felted.

5. The fabric of claim 1 wherein the geometric shapes are projections and slots which interlock in the direction of the paper carrying surface of the fabric.

6. A papermaker's fabric comprising:
a plurality of elements, each having a length commensurate with the cross machine direction width of the desired fabric, positioned with their longitudinal axes oriented in the cross machine direction;
a female member formed in and extending along one longitudinal edge of each of said elements;
a male member formed in and extending along another, opposite longitudinal edge of each of said elements, each of said elements thereby being formed with a complementary female and male member on respective opposite sides thereof; and
said plurality of elements connected one next to the other, by means of said female and male members, in sufficient numbers to form a fabric length as required, said connection formed by snap-fitting the respective male and female members of adjacent elements.

7. The fabric of claim 6 wherein the fabric is endless.

8. The fabric of claim 6 wherein the fabric is seamed.

9. The fabric of claim 6 wherein the fabric further comprises a felt adhered to at least one surface thereof.

10. The fabric of claim 6 wherein the male and female members are geometric shapes which lock in the direction of the paper carrying surface of the fabric.

11. A papermaker's fabric comprising:
a plurality of elements, each having a length commensurate with the cross machine direction length of the fabric and its longitudinal axes oriented in the cross machine direction;
each of said elements having complementary male and female members extending along each longitudinal edge thereof; whereby
the elements are connected one next to the other, by interlocking the complementary male and female members of adjacent elements to establish the machine direction length of the fabric.

12. The fabric of claim 11 wherein each of the elements further comprise male members which extend beyond the longitudinal edge thereof and female members which are recessed from the longitudinal edge thereof.

13. The fabric of claim 11 wherein each of said elements comprises a male member which depends from a longitudinal edge thereof and a female member which extends from a longitudinal edge thereof.

14. The fabric of claim 11 wherein each of said elements is comprised of male and female members having complementary configurations which, when interconnected, define a pintle receiving channel.

15. A papermaker's fabric comprising:
a plurality of elements, each having a length commensurate with the cross machine direction length of the fabric and its longitudinal axes oriented in the cross machine direction;
each of said elements having a plurality of male members extending along a first longitudinal edge and a plurality of complementary female members extending along an opposite longitudinal edge thereof, whereby
the elements are connected one next to the other, by interlocking the complementary male and female members of adjacent elements to establish the machine direction length of the fabric.

16. A tessellated papermaker's fabric comprised of:
a plurality of tessellation elements having at least one geometric shape along an edge thereof interconnected by the said geometric shapes in a tessellation commensurate with the desired length and width of the fabric.

17. A tessellated papermaker's fabric comprising:
a plurality of elements interconnected in a tessellation commensurate with the desired length and width of the fabric.

* * * * *